United States Patent
Yasui (10) Patent No.: US 9,696,433 B2
(45) Date of Patent: Jul. 4, 2017

(54) RADIATION MEASUREMENT APPARATUS AND RADIATION MEASUREMENT METHOD

(71) Applicant: CANON KABUSHIKI KAISHA, Tokyo (JP)

(72) Inventor: Koji Yasui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/853,798

(22) Filed: Sep. 14, 2015

(65) Prior Publication Data
US 2016/0077219 A1    Mar. 17, 2016

(30) Foreign Application Priority Data
Sep. 16, 2014 (JP) ................................. 2014-187592

(51) Int. Cl.
*G01T 1/20* (2006.01)
*G01T 1/24* (2006.01)
*G01T 1/29* (2006.01)

(52) U.S. Cl.
CPC .............. *G01T 1/20* (2013.01); *G01T 1/2928* (2013.01)

(58) Field of Classification Search
CPC ................ G01T 1/24; G01T 1/16; G01T 1/20
See application file for complete search history.

(56) References Cited

U.S. PATENT DOCUMENTS

| 5,525,803 | A | 6/1996 | Watanabe et al. |
| 5,821,541 | A * | 10/1998 | Tumer ................ G01T 1/006 250/363.03 |
| 6,512,232 | B2 | 1/2003 | Pehl et al. |
| 2010/0108894 | A1 | 5/2010 | Pratx et al. |

FOREIGN PATENT DOCUMENTS

EP    0637759 A1    2/1995

* cited by examiner

Primary Examiner — David Porta
Assistant Examiner — Faye Boosalis
(74) Attorney, Agent, or Firm — Canon USA Inc., IP Division

(57) ABSTRACT

A radiation measurement apparatus includes an array-type radiation detector and an information calculation unit which obtains information on energies detected by pixels of the detector and information on a pixel on which a radiation ray is incident. The information calculation unit includes an energy conversion unit which converts a detected signal of a pixel which is equal to or larger than a predetermined threshold value into a detected energy value, a judgment value calculation unit which obtains a judgment value used to judge whether Compton scattering has been generated in the pixel in accordance with the detected energy, a judgment unit which judges whether the Compton scattering has been generated in the pixel in accordance with the judgment value, and a determination unit which obtains information on a pixel on which a radiation ray is first incident in accordance with a result of the judgment performed by the judgment unit.

10 Claims, 4 Drawing Sheets

FIG. 6

RADIATION MEASUREMENT APPARATUS AND RADIATION MEASUREMENT METHOD

BACKGROUND OF THE INVENTION

Field of the Invention

The present invention relates to a radiation measurement apparatus which obtains information on a position on which a radiation ray is incident and a radiation measurement method.

Description of the Related Art

In an array-type gamma-ray (γ-ray) detector including a plurality of pixels, signals may be detected in a number of pixels of the detector since a γ-ray reaches neighboring pixels in a case where Compton scattering is generated in a pixel on which the γ-ray is incident. In this case, it is difficult to determine a position (pixel) on which the γ-ray is externally incident. In general, a position on which a γ-ray is incident is determined by various methods. In a case where all energy of a detected γ-ray is equal to or smaller than 511 keV, a maximum value of an energy detected in a pixel in which the Compton scattering is generated once is equal to or smaller than half of that of the incident γ-ray. Therefore, in a case where signals are detected in two pixels, one of the pixels in which a lower energy is detected, that is, one of the pixels in which the Compton scattering is generated, is judged as a pixel on which the γ-ray is incident. An example is described in U.S. Pat. No. 6,512,232.

However, depending on an energy of an incident γ-ray, a detected energy of a pixel in which the Compton scattering is generated becomes larger than a detected energy of a pixel in which photoelectric absorption is generated. Furthermore, in a case where the Compton scattering is generated a plurality of times, signals are detected in three or more pixels.

SUMMARY OF THE INVENTION

The present invention is directed to a method and apparatus for the obtainment of information on an incident radiation ray by obtaining information on a pixel on which the radiation ray is first incident. In the present invention, in a case where signals are detected in a plurality of pixels, Compton scattering judgment values for judging whether the Compton scattering has been generated in individual pixels are used. Then, information on a position on which the radiation ray is first incident is obtained from information on a pixel in which it is judged that the Compton scattering has been generated.

The present invention provides a radiation measurement apparatus including an array-type radiation detector having a plurality of pixels and an information calculation unit which obtains information on detected energies of the individual pixels from the radiation detector and information on a pixel on which a radiation ray is incident. The information calculation unit includes an energy conversion unit configured to convert a detected signal of a pixel which is equal to or larger than a predetermined threshold value into a detected energy, a judgment value calculation unit configured to obtain a Compton scattering judgment value used to judge whether Compton scattering has been generated in the pixel in accordance with the detected energy, a scattering judgment unit configured to judge whether the Compton scattering has been generated in the pixel in accordance with the Compton scattering judgment value, and an incident pixel determination unit configured to obtain information on a pixel on which a radiation ray is first incident in accordance with a result of the judgment performed by the scattering judgment unit.

Further features of the present invention will become apparent from the following description of exemplary embodiments with reference to the attached drawings.

DESCRIPTION OF THE EMBODIMENTS

In the present invention, a Compton scattering judgment value used to judge whether the Compton scattering has been generated in a pixel of interest (target pixel) is obtained in accordance with a detected energy of the pixel, and it is judged whether the Compton scattering has been generated in the pixel of interest in accordance with the Compton scattering judgment value. In accordance with the judgment, information on a pixel on which a radiation ray is first incident is obtained. In a case where the Compton scattering of an incident radiation ray is generated in a γ-ray camera including an array-type radiation detector, such as a scintillator, signals are likely to be detected in more than one pixel (i.e., in a plurality of pixels). In this case, accuracy of a determination of a pixel on which a radiation ray is first incident is likely to be lowered. However, in the present invention, Compton scattering judgment values are obtained in accordance with detected energies of individual pixels and judgments as to whether a probability that the Compton scattering is generated is high are made so that information on a pixel on which a radiation ray is first incident is obtained.

In embodiments described hereinafter, a radiation ray corresponds to a γ-ray. However, the embodiments are applicable to other radiation rays having energy which is sufficient for generating Compton scattering.

First Embodiment

A first embodiment of the present invention will be described. In the following description, it is assumed that persons having ordinary skill in the art or radiation imaging are familiar with the basic principles of Compton scattering which are well known, and are therefore omitted.

Figure 1:
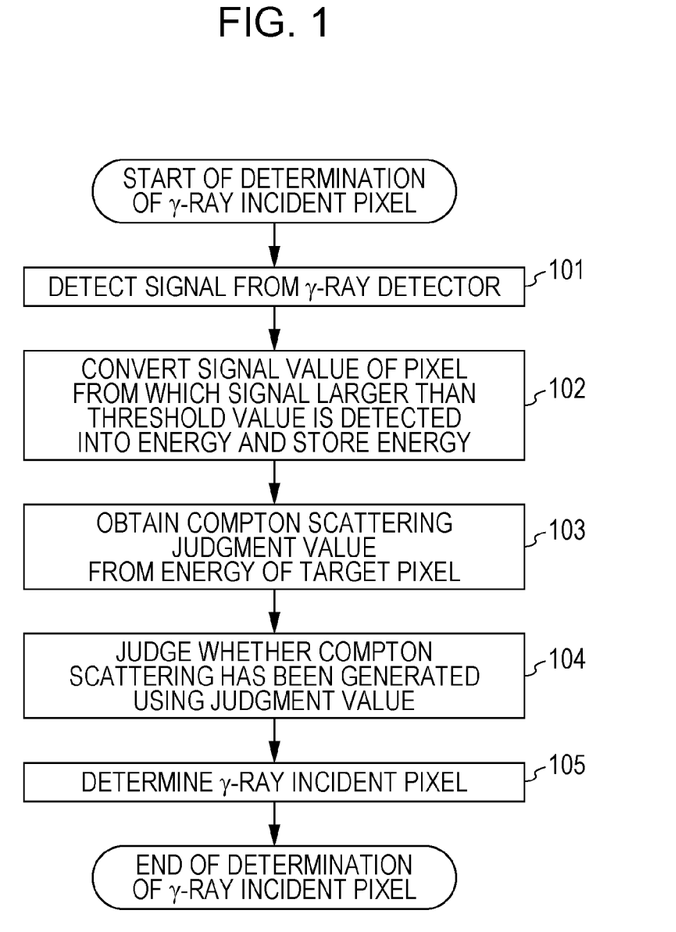
FIG. 1 is a flowchart illustrating a method for determining a pixel on which a γ-ray is incident according to a first embodiment.
Figure 2:
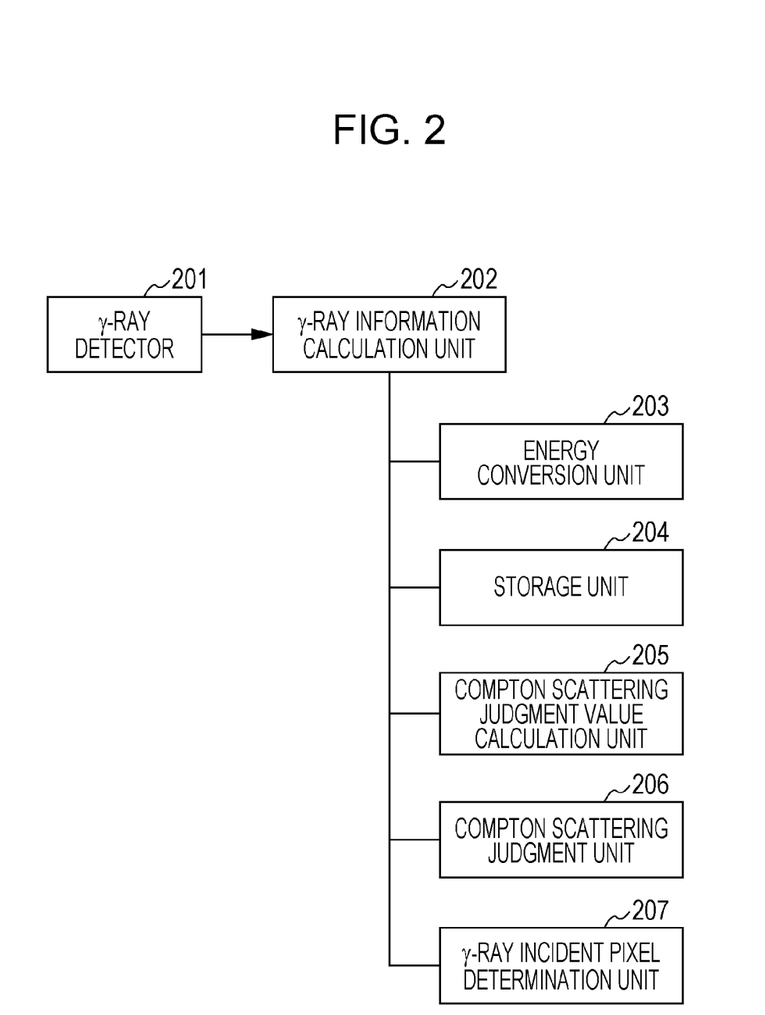
FIG. 2 is a diagram schematically illustrating a system configuration according to the first embodiment.
Figure 3:
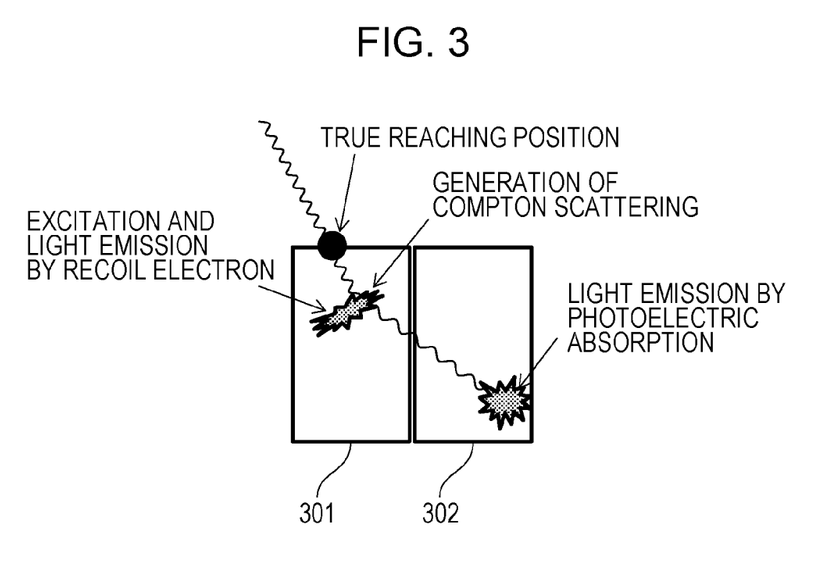
FIG. 3 is a diagram schematically illustrating an event in which a γ-ray is detected in a plurality of pixels.

FIG. 1 is a flowchart of a method for determining a pixel on which a γ-ray is incident. In step 101, signals generated by events, such as the Compton scattering and photoelectric absorption, in pixels in a γ-ray detector 201 illustrated in FIG. 2 are detected. Here, an example of an event in which signals are detected in a plurality of pixels is illustrated in FIG. 3. In a case where a γ-ray is incident on a certain pixel 301 and the Compton scattering is generated in the pixel, a recoil electron and a scattering γ-ray are generated in a Compton scattering point. The recoil electron is absorbed in the pixel on which the γ-ray is incident. On the other hand, the scattering γ-ray reaches a pixel 302 which is different from the pixel 301 on which the γ-ray is incident and loses all energy thereof by photoelectric absorption. Therefore, in this event, when a radiation ray is incident on a detector, signals are detected in two pixels.

In step 102, a value of a signal detected in a pixel which is larger than a certain threshold value, among the pixels in which the signals are detected, is converted into an energy value to be stored. In a case where signal values of the two pixels in FIG. 3 are larger than the certain threshold value, an energy conversion unit 203 converts the detected signals of the two pixels into energy values to be stored in a storage unit 204. The term "signal value" means a peak value of an output electric signal (that is, information on a maximum value of the signal) in a case where the γ-ray detector 201 includes a scintillator and a photoelectron multiplier, for example.

In step 103, Compton scattering judgment values are obtained from the detected energies. A Compton scattering judgment value (CSV) is obtained from an energy of a pixel stored in the storage unit 204 using a judgment value calculation unit 205 in accordance with Expression 1.

$$CSV = \frac{\frac{d\sigma}{d\Omega}(E_o - E_\gamma)}{\frac{d\sigma}{d\Omega}(E_\gamma) + \frac{d\sigma}{d\Omega}(E_o - E_\gamma)}$$ Expression 1

$$\frac{d\sigma}{d\Omega}(E_\gamma) \propto$$

$$\left(\frac{1}{1+k(1-\cos\theta)}\right)^2 \left(1 + \cos^2\theta + \frac{k^2(1-\cos\theta)^2}{\{1+k(1-\cos\theta)\}}\right)$$

$$k = \frac{E_o}{mc^2}$$

$$\cos\theta = 1 - \frac{mc^2}{E_o}\frac{E_o - E_\gamma}{E_\gamma}$$

Here, dσ/dΩ is obtained according to the Klein-Nishina formula. An incident energy $E_O$ of the γ-ray which is incident on the γ-ray detector 201 may be obtained from all energies of the all pixels. "$E_\gamma$" denotes a detected energy of a certain pixel. "$mc^2$" denotes a static energy of an electron. "dσ/dΩ($E_\gamma$)" denotes a differential scattering cross-section of the γ-ray having the energy of $E_\gamma$, and "dσ/dΩ($E_O-E_\gamma$)" denotes a differential scattering cross-section of the γ-ray which is assumed to have a remaining energy. The Compton scattering of the γ-ray is tentatively assumed in this way since a pixel in which the Compton scattering is generated is not known. This assumption is verified by verification performed thereafter.

Figure 4:
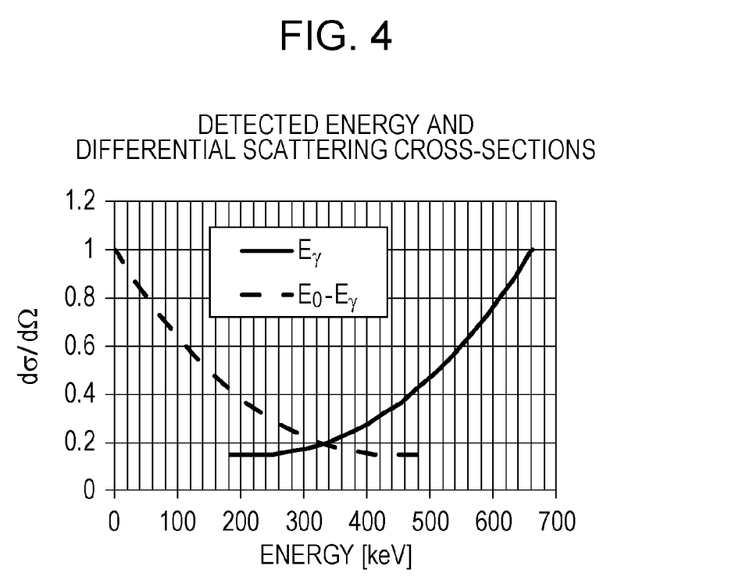
FIG. 4 is a graph illustrating detected-energy dependency of differential scattering cross-sections.

FIG. 4 is a graph illustrating the relationship between the differential scattering cross-section dσ/dΩ($E_\gamma$) and the differential scattering cross-section dσ/dΩ($E_O-E_\gamma$) in a case where an energy $E_O$ of the incident γ-ray is 662 keV. Assuming that the detected energy $E_\gamma$ is an energy of the scattering γ-ray, "$E_O-E_\gamma$" represents an energy of the recoil electron. However, as a Compton scattering judgment value in this embodiment, a differential scattering cross-section (Klein-Nishina formula) relative to the γ-ray is employed as described above.

In step 104, a scattering judgment unit 206 judges whether the Compton scattering has been generated in a pixel of interest in accordance with the Compton scattering judgment value. In Expression 1, the Compton scattering judgment value CSV is a value in a range from 0 to 1. When the value of the Compton scattering judgment value CSV is equal to or larger than 0.5, that is, when the differential scattering cross-section dσ/dΩ($E_O-E_\gamma$) is larger than the differential scattering cross-section dσ/dΩ($E_\gamma$), it is determined that a scattering probability derived from the recoil electron is larger in a pixel of interest, and accordingly, it is determined that the Compton scattering has been generated. Specifically, the scattering judgment unit 206 judges that the Compton scattering has been generated in the pixel of interest in a case where the Compton scattering judgment value is equal to or larger than an average of possible values of the Compton scattering judgment value. In the case of this embodiment, it is judged that the differential scattering cross-section dσ/dΩ($E_O-E_\gamma$) is larger in pixels in which detected energies are equal to or smaller than half of incident energy, that is, it is judged that the Compton scattering has been generated. FIG. 4 is the graph representing this situation, and in a case where a detected energy is equal to or smaller than approximately 331 keV, dσ/dΩ($E_O-E_\gamma$) is larger than the differential scattering cross-section dσ/dΩ($E_\gamma$).

In step 105, the pixel on which the γ-ray is incident is determined. Here, in a case where the scattering judgment unit 206 judges that the Compton scattering has been generated in only one pixel among pixels having a detected energy equal to or larger than a predetermined threshold value, the pixel is determined as the pixel on which the radiation ray is incident. However, in a case where the scattering judgment unit 206 judges that the Compton scattering has been generated in a plurality of pixels, one of the pixels is determined as the pixel on which the γ-ray is incident. Here, an incident pixel determination unit 207 determines one of the pixels which are judged that the Compton scattering has been generated which is nearest to a center of a surface of an array as the pixel on which the γ-ray is incident. This is because, it is assumed that, when the γ-ray detector 201 is disposed relative to a radiation source, the radiation source is disposed in a position along an axis which is vertical to the surface of the array and which extends from a portion near the center of the array surface if possible. In this case, the number of radiation rays incident on the pixel positioned at the center is larger than the numbers of radiation rays incident on pixels positioned around the pixel at the center in the total number of γ-rays incident on the γ-ray detector 201.

On the other hand, in a case where the Compton scattering is not generated in any pixel, a pixel, among the pixels used for the judgment, which has a smallest detected energy is judged as the pixel on which the γ-ray is incident. This is because, according to FIG. 4, it is highly likely that the probability that a smaller detected energy corresponds to a γ-ray derived from energy of the recoil electron is high. This is guaranteed by a theoretical formula for a stopping power representing that detected energies of later pixels become larger as the γ-ray advances.

Alternatively, it may not be determined that one pixel is the pixel on which the γ-ray is incident in step 105, but a ratio among the Compton scattering judgment values of the individual pixels may set as a ratio among degrees of the probabilities that the individual pixels are incident pixels. In this case, a result of an assumption of an incoming direction of the γ-ray may be probabilistically weighted.

According to the result described above, an image reconstruction apparatus may generate image data of distribution of a radiation source from incident direction vectors of individual incident γ-rays. Accordingly, an image of the distribution of the radiation source may be displayed by a display apparatus in accordance with the image data.

Second Embodiment

A second embodiment of the present invention will be described. The second embodiment is different from the first embodiment in the step of judging generation of the Compton scattering from a Compton scattering judgment value (step 104). Since a Compton scattering judgment value CSV is in the range from 0 to 1, a random number of a real number from 0 to 1 is generated by a random number generation unit (not illustrated) connected to an information calculation unit 202 through a bus. Then the scattering judgment unit 206 judges that the Compton scattering has been generated when the random number is smaller than the Compton scattering judgment value CSV. That is, an arbitrary real number in a range between a minimum value and a maximum value of possible values of the Compton scattering judgment value used for judging whether the Compton scattering has been generated is generated in addition to the Compton scattering judgment value. Then, the scattering judgment unit 206 judges that the Compton scattering has been generated in a pixel of interest when the Compton scattering judgment value is smaller than the real value in accordance with the Compton scattering judgment value and the arbitrary real number.

Third Embodiment

A third embodiment of the present invention will be described. The third embodiment is different from the first embodiment in the step of obtaining a Compton scattering judgment value from a detected energy (step 103). A Compton scattering judgment value CSV is obtained from an energy of each pixel stored in a storage unit 204 using a judgment value calculation unit 206.

$$CSV = \frac{P_{comp}}{P_{phot} + P_{comp}} \quad \text{Expression 2}$$

$$P_{comp} = \left[1 - \exp\left(\sum_i \frac{-t}{m_i}\right)\right] \frac{\frac{1}{m_{comp}}}{\sum_i \frac{1}{m_i}}$$

$$P_{phot} = \left[1 - \exp\left(\sum_i \frac{-t}{m_i}\right)\right] \frac{\frac{1}{m_{phot}}}{\sum_i \frac{1}{m_i}}$$

$$\frac{1}{m_i} = \rho_i \times \kappa_i \quad i: \text{phot or comp}$$

Figure 5:
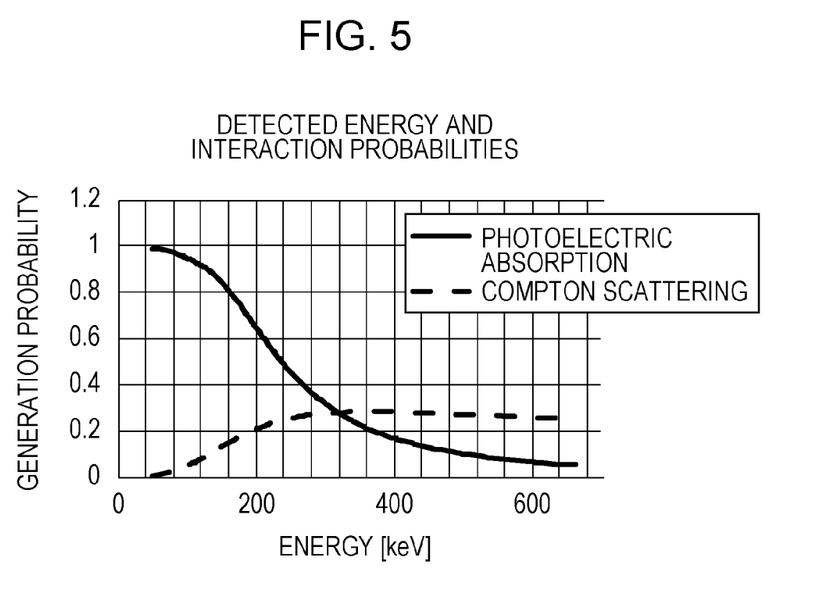
FIG. 5 is a graph illustrating detected-energy dependency of interaction generation probabilities according to a third embodiment.

Here, a probability $P_{comp}$ and a probability $P_{phot}$ represent a probability of generation of the Compton scattering and a probability of generation of the photoelectric absorption, respectively, in a case where a mean free path is denoted by "$m_i$", a mass density is denoted by "$\rho_i$", a mass absorption coefficient is denoted by "$\kappa_i$", and a pixel representative depth (a height of a pixel in a direction vertical to a radiation incident surface of a pixel array) is denoted by "t". Here, "i" denotes a type of an event generated in each pixel. A ratio between the two interaction generation probabilities is determined as a Compton scattering judgment value, and a judgment as to whether the Compton scattering has been generated in a pixel of interest is made. The mass density and the representative depth vary depending on a type or a shape of a γ-ray detector 201, and the interaction probabilities also depend on energy of a γ-ray. Therefore, the interaction probabilities are stored in advance in an interaction probability storage unit (not illustrated) connected to an information calculation unit 202 through a bus as data on the interaction generation probabilities illustrated in FIG. 5. Here, a mass absorption coefficient κ is changed in accordance with a detected energy of each pixel and the interaction generation probabilities are calculated using Expression 2. In this way, in this embodiment, the storage unit 204 is provided which stores the relationship between the probability that interaction between photons of the photoelectric absorption and the detected energy is generated and the probability that interaction between substances of the Compton scattering and the detected energy is generated.

Fourth Embodiment

A fourth embodiment of the present invention will be described. The fourth embodiment is different from the third embodiment in the step of judging whether the Compton scattering has been generated in accordance with a Compton scattering judgment value (step 104). Since the Compton scattering judgment value CSV of Expression 2 is a value in a range from 0 to 1, a random number of a real number in a range from 0 to 1 is generated by a random number generation unit (not illustrated) connected to an information calculation unit 202 through the bus. A scattering judgment unit 206 judges that the Compton scattering has been generated in a case where a value of the random number is smaller than the Compton scattering judgment value CSV.

Fifth Embodiment

Figure 6:
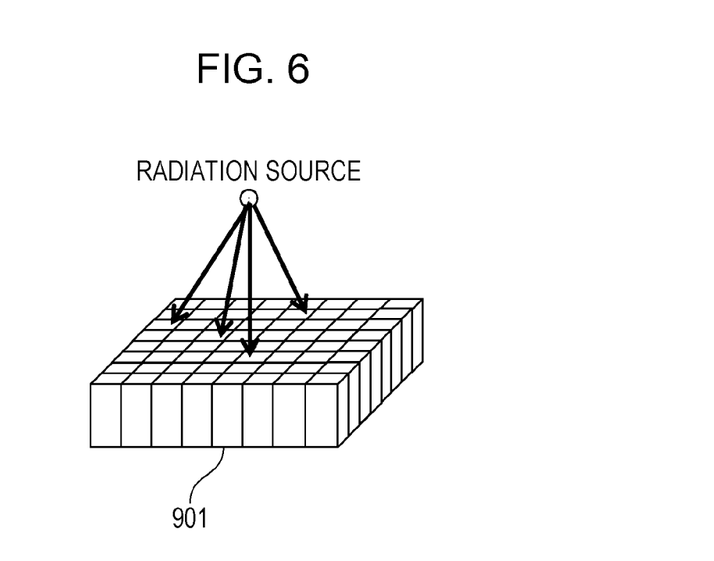
FIG. 6 is a diagram schematically illustrating a Monte Carlo simulation model.

A fifth embodiment of the present invention will be described hereinafter. FIG. 6 is a diagram illustrating a simulation model for verification. The Monte Carlo simulation is performed under the following condition. A point source is disposed in a position which is above a center of a surface of an array-type scintillator formed by pixels in a matrix of 8×8, and 100000 γ-rays having an energy of 662 keV are irradiated in random directions within a range in which the γ-rays reach the surface of the scintillator. Here, the scintillator is formed of GSO and has a representative depth of 13 mm. A threshold value which is a lower limit of a detected energy is 50 keV. Among results of the simulation, only events in which the Compton scattering and the photoelectric absorption are generated in the scintillator are extracted. Then, position numbers (i, j) of detected pixels and detected energies Eγ are sorted in ascending order. Here, since the scintillator includes the pixels in the matrix of 8×8, information on a pixel (i, j) (a position number and a detected energy) is described in an (i*8+j)-th row.

Under this condition, determination accuracies of the foregoing embodiments are evaluated in accordance with a pixel determined by the γ-ray incident pixel determination method described above and the results of the simulation. According to the results of the simulation, the number of events in which both of the Compton scattering and the photoelectric absorption are generated is 11198. In the 11198 events, a number of events have large sums of absorption energies in a pixel of interest since the Compton scattering is generated a plurality of times in the same pixel. Accordingly, in a case where the Compton scattering is generated a plurality of times in the same pixel, accuracy of the Compton scattering judgment value may be degraded, and accordingly, it is assumed that the numbers of correct answers described below by the determination methods according to the foregoing embodiments are smaller than the number of events described above.

The number of correct answers in the first embodiment is 3915. On the other hand, the number of correct answers under a judgment condition which is substantially the same as the condition of U.S. Pat. No. 6,512,232 is 3779. Accordingly, improvement of the accuracy of the determination of the γ-ray incident pixel is achieved. Note that, as described above, incorrect events are generated since an absorption energy of the pixel of interest is increased and a Compton scattering judgment value is reduced since the Compton scattering is generated a plurality of times in the same pixel, for example.

The number of correct answers is 4448 in the second embodiment, 6845 in the third embodiment, and 5265 in the fourth embodiment. In all the embodiments, improvement of the accuracy of the determination of the γ-ray incident pixel is achieved.

Other Embodiments

The present invention may be embodied by the following modes. A storage media which stores program codes of software which when executed by one or more processors realizes the functions used in the first to fourth embodiments (the function of the information calculation unit 202 and the like, for example) may be supplied to a radiation measurement apparatus or a gamma camera. The program codes of the software may also be supplied through a local (private) network or through the Internet. Furthermore, a computer (a CPU, an MPU, or the like), in which the information calculation unit 202, is included reads the program codes so as to execute the functions of some or all of the energy conversion unit, judgment value calculation unit, scattering judgment unit, and incident pixel determination unit.

The present invention is applied to a gamma camera and the like used for environment radiation measurement, nuclear medicine diagnosis, and the like.

According to the present invention, accuracy of a determination of information on a position on which a radiation ray is first incident among a plurality of pixels included in an array-type radiation detector may be improved, and as a result, accuracy of a determination of a direction in which the radiation ray is incident may be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-187592, filed Sep. 16, 2014, which is hereby incorporated by reference herein in its entirety.

What is claimed is:

1. A radiation measurement apparatus including an array-type radiation detector having a plurality of pixels and an information calculation unit which obtains information on detected energies of the individual pixels from the radiation detector and information on a pixel on which a radiation ray is incident,
wherein the information calculation unit includes
an energy conversion unit configured to convert a detected signal of a pixel which is equal to or larger than a predetermined threshold value into a detected energy,
a judgment value calculation unit configured to obtain a Compton scattering judgment value used to judge whether Compton scattering has been generated in the pixel in accordance with the detected energy,
a scattering judgment unit configured to judge whether the Compton scattering has been generated in the pixel in accordance with the Compton scattering judgment value, and
an incident pixel determination unit configured to obtain information on a pixel on which a radiation ray is first incident in accordance with a result of the judgment performed by the scattering judgment unit, and
wherein the judgment value calculation unit obtains a Compton scattering judgment value CSV of the pixel in accordance with Expression 1 below based on the Klein-Nishina formula dσ/dΩ, an incident energy $E_O$, a detected energy $E_\gamma$, and an electron static energy $mc^2$:

$$CSV = \frac{\frac{d\sigma}{d\Omega}(E_o - E_\gamma)}{\frac{d\sigma}{d\Omega}(E_\gamma) + \frac{d\sigma}{d\Omega}(E_o - E_\gamma)} \qquad \text{Expression 1}$$

$$\frac{d\sigma}{d\Omega}(E_\gamma) \propto$$

$$\left(\frac{1}{1+k(1-\cos\theta)}\right)^2 \left(1 + \cos^2\theta + \frac{k^2(1-\cos\theta)^2}{\{1+k(1-\cos\theta)\}}\right)$$

$$k = \frac{E_o}{mc^2}$$

$$\cos\theta = 1 - \frac{mc^2}{E_o}\frac{E_o - E_\gamma}{E_\gamma}.$$

2. The radiation measurement apparatus according to claim 1, wherein
the information calculation unit further includes a storage unit configured to store the detected energy of the pixel.

3. The radiation measurement apparatus according to claim 1, wherein
the radiation ray is a γ-ray.

4. A radiation measurement apparatus including an array-type radiation detector having a plurality of pixels and an information calculation unit which obtains information on detected energies of the individual pixels from the radiation detector and information on a pixel on which a radiation ray is incident,
wherein the information calculation unit includes
an energy conversion unit configured to convert a detected signal of a pixel which is equal to or larger than a predetermined threshold value into a detected energy,
a judgment value calculation unit configured to obtain a Compton scattering judgment value used to judge whether Compton scattering has been generated in the pixel in accordance with the detected energy,
a scattering judgment unit configured to judge whether the Compton scattering has been generated in the pixel in accordance with the Compton scattering judgment value, and an incident pixel determination unit configured to obtain information on a pixel on which a radiation ray is first incident in accordance with a result of the judgment performed by the scattering judgment unit, and wherein the information calculation unit further includes a storage unit configured to store the relationship between a probability of generation of interaction between a photon of photoelectric absorption and the detected energy and a probability of generation of interaction between a substance of the Compton scattering and the detected energy.

5. The radiation measurement apparatus according to claim 4, wherein the judgment value calculation unit obtains a Compton scattering judgment value CSV in accordance with Expression 2 below using a probability $P_{comp}$ of generation of the Compton scattering and a probability $P_{phot}$ of generation of the photoelectric absorption in a case where a type of an event generated in the pixel is denoted by "i", a mean free path of each event is denoted by "$m_i$", a mass density is denoted by "$\rho_i$", a mass absorption coefficient is denoted by "$\kappa_i$", and a pixel representative depth is denoted by "t":

$$CSV = \frac{P_{comp}}{P_{phot} + P_{comp}} \quad \text{Expression 2}$$

$$P_{comp} = \left[1 - \exp\left(\sum_i \frac{-t}{m_i}\right)\right] \frac{\frac{1}{m_{comp}}}{\sum_i \frac{1}{m_i}}$$

$$P_{phot} = \left[1 - \exp\left(\sum_i \frac{-t}{m_i}\right)\right] \frac{\frac{1}{m_{phot}}}{\sum_i \frac{1}{m_i}}$$

$$\frac{1}{m_i} = \rho_i \times \kappa_i \quad i: \text{phot or comp.}$$

6. A radiation measurement apparatus including an array-type radiation detector having a plurality of pixels and an information calculation unit which obtains information on detected energies of the individual pixels from the radiation detector and information on a pixel on which a radiation ray is incident, wherein the information calculation unit includes
an energy conversion unit configured to convert a detected signal of a pixel which is equal to or larger than a predetermined threshold value into a detected energy,
a judgment value calculation unit configured to obtain a Compton scattering judgment value used to judge whether Compton scattering has been generated in the pixel in accordance with the detected energy,
a scattering judgment unit configured to judge whether the Compton scattering has been generated in the pixel in accordance with the Compton scattering judgment value, and
an incident pixel determination unit configured to obtain information on a pixel on which a radiation ray is first incident in accordance with a result of the judgment performed by the scattering judgment unit, and wherein the scattering judgment unit judges that the Compton scattering has been generated in the pixel in a case where the Compton scattering judgment value is larger than an average of possible values.

7. A radiation measurement apparatus including an array-type radiation detector having a plurality of pixels and an information calculation unit which obtains information on detected energies of the individual pixels from the radiation detector and information on a pixel on which a radiation ray is incident, wherein the information calculation unit includes
an energy conversion unit configured to convert a detected signal of a pixel which is equal to or larger than a predetermined threshold value into a detected energy,
a judgment value calculation unit configured to obtain a Compton scattering judgment value used to judge whether Compton scattering has been generated in the pixel in accordance with the detected energy,
a scattering judgment unit configured to judge whether the Compton scattering has been generated in the pixel in accordance with the Compton scattering judgment value, and
an incident pixel determination unit configured to obtain information on a pixel on which a radiation ray is first incident in accordance with a result of the judgment performed by the scattering judgment unit, wherein the information calculation unit further includes a random number generation unit configured to generate an arbitrary real number in a range between a minimum value and a maximum value of possible values of the Compton scattering judgment value which is used to judge whether the Compton scattering has been generated, in addition to the Compton scattering judgment value, and wherein the scattering judgment unit judges that the Compton scattering has been generated in the pixel in a case where the Compton scattering judgment value is smaller than the real number in accordance with the Compton scattering judgment value and the arbitrary real number.

8. A radiation measurement apparatus including an array-type radiation detector having a plurality of pixels and an information calculation unit which obtains information on detected energies of the individual pixels from the radiation detector and information on a pixel on which a radiation ray is incident, wherein the information calculation unit includes
an energy conversion unit configured to convert a detected signal of a pixel which is equal to or larger than a predetermined threshold value into a detected energy,
a judgment value calculation unit configured to obtain a Compton scattering judgment value used to judge whether Compton scattering has been generated in the pixel in accordance with the detected energy,
a scattering judgment unit configured to judge whether the Compton scattering has been generated in the pixel in accordance with the Compton scattering judgment value, and
an incident pixel determination unit configured to obtain information on a pixel on which a radiation ray is first incident in accordance with a result of the judgment performed by the scattering judgment unit, and wherein the incident pixel determination unit determines, when the scattering judgment unit judges that the Compton scattering has been generated in only one of pixels having detected energies equal to or larger than the threshold value, that the pixel corresponds to the pixel on which a radiation ray is incident, determines, when the scattering judgment unit judges that the Compton scattering has been generated in a plurality of pixels, that one of the pixels which is positioned nearest to a center of a surface of the array-type radiation detector is the pixel on which a radiation ray is incident, and determines, when the scattering judgment unit judges that the Compton scattering has not been generated in any of the pixels, that one of the pixels used for the judgment which has a smallest detected energy is the pixel on which a radiation ray is incident.

9. A radiation measurement apparatus including an array-type radiation detector having a plurality of pixels and an information calculation unit which obtains information on detected energies of the individual pixels from the radiation detector and information on a pixel on which a radiation ray is incident, wherein the information calculation unit includes
an energy conversion unit configured to convert a detected signal of a pixel which is equal to or larger than a predetermined threshold value into a detected energy,
a judgment value calculation unit configured to obtain a Compton scattering judgment value used to judge whether Compton scattering has been generated in the pixel in accordance with the detected energy,
a scattering judgment unit configured to judge whether the Compton scattering has been generated in the pixel in accordance with the Compton scattering judgment value, and
an incident pixel determination unit configured to obtain information on a pixel on which a radiation ray is first incident in accordance with a result of the judgment performed by the scattering judgment unit, and
wherein the incident pixel determination unit determines, in the pixels having detected energies equal to or larger than the predetermined threshold value, a ratio between Compton scattering judgment values of the pixels obtained by the judgment value calculation unit as a ratio between degrees of possibilities that the pixels correspond to the pixel on which a radiation ray is incident.

10. A radiation measurement method for obtaining information on detected energies of pixels from an array-type radiation detector including a plurality of pixels and information on a pixel on which a radiation ray is incident, the radiation measurement method comprising:
converting a detected signal of a pixel which is equal to or larger than a predetermined threshold value into a detected energy,
obtaining a Compton scattering judgment value used to judge whether Compton scattering has been generated in the pixel in accordance with the detected energy of the pixel,
judging whether the Compton scattering has been generated in the pixel in accordance with the Compton scattering judgment value, and
obtaining information on a pixel on which a radiation ray is first incident in accordance with a result of the judging,
wherein, when the Compton scattering judgment value indicates that the Compton scattering has been generated in only one of pixels having detected energies equal to or larger than the threshold value, the judging step determines that the pixel corresponds to the pixel on which a radiation ray is incident, when the Compton scattering value indicates that the Compton scattering has been generated in a plurality of pixels, the judging step determines that one of the pixels which is positioned nearest to a center of a surface of the array-type radiation detector is the pixel on which a radiation ray is incident, and when the Compton scattering judgment value indicates that the Compton scattering has not been generated in any of the pixels, the judgement step determines that one of the pixels used for the judgment which has a smallest detected energy is the pixel on which a radiation ray is incident.

* * * * *